(12) United States Patent
Yamamoto

(10) Patent No.: US 7,447,742 B1
(45) Date of Patent: Nov. 4, 2008

(54) DUAL-FRAME USER INTERFACE ON GENERIC CLIENT SOFTWARE

(75) Inventor: Bryan G. Yamamoto, San Francisco, CA (US)

(73) Assignee: Mirapoint Software, Inc., Sunnyvale, CA (US)

( * ) Notice: Subject to any disclaimer, the term of this patent is extended or adjusted under 35 U.S.C. 154(b) by 581 days.

(21) Appl. No.: 09/823,425

(22) Filed: Mar. 30, 2001

(51) Int. Cl.
G06F 15/16 (2006.01)

(52) U.S. Cl. ............... 709/206; 709/225; 709/229; 715/821

(58) Field of Classification Search .......... 709/224, 709/227, 248, 206, 230, 200; 715/512, 500, 715/716, 504; 700/8, 17; 345/764, 594, 345/503, 531; 719/329; 725/93; 717/109
See application file for complete search history.

(56) References Cited

U.S. PATENT DOCUMENTS

| | | | |
|---|---|---|---|
| 4,692,858 A * | 9/1987 | Redford et al. ............ 345/744 |
| 5,233,513 A * | 8/1993 | Doyle ........................ 705/7 |
| 5,583,561 A * | 12/1996 | Baker et al. .................. 725/93 |
| 5,764,227 A * | 6/1998 | Ishimine ...................... 345/807 |
| 5,792,972 A * | 8/1998 | Houston ...................... 84/645 |
| 5,801,685 A * | 9/1998 | Miller et al. ............... 715/500.1 |
| 5,801,705 A * | 9/1998 | Kato et al. ................... 345/419 |
| 5,835,922 A * | 11/1998 | Shima et al. ................ 715/522 |
| 5,838,334 A * | 11/1998 | Dye ........................... 345/503 |
| 5,844,554 A * | 12/1998 | Geller et al. ............... 715/744 |
| 5,857,011 A * | 1/1999 | Kennedy et al. ......... 379/29.06 |
| 5,872,521 A * | 2/1999 | Lopatukin et al. ......... 340/7.52 |
| 5,878,336 A * | 3/1999 | Cashen et al. ............ 455/343.4 |
| 5,920,711 A * | 7/1999 | Seawright et al. ............ 703/15 |
| 5,941,957 A * | 8/1999 | Ingrassia et al. ............ 709/248 |
| 5,990,892 A * | 11/1999 | Urbain ........................ 345/853 |
| 5,991,780 A * | 11/1999 | Rivette et al. ................ 715/512 |
| 6,028,604 A * | 2/2000 | Matthews et al. ........... 715/821 |
| 6,046,740 A * | 4/2000 | LaRoche et al. ............ 715/764 |
| 6,067,098 A * | 5/2000 | Dye ........................... 345/531 |
| 6,088,707 A * | 7/2000 | Bates et al. ............... 715/501.1 |
| 6,178,439 B1 * | 1/2001 | Feit ........................... 709/200 |
| 6,204,846 B1 * | 3/2001 | Little et al. ................ 715/784 |
| 6,236,994 B1 * | 5/2001 | Swartz et al. .................. 707/6 |
| 6,275,935 B1 * | 8/2001 | Barlow et al. ............... 713/182 |
| 6,298,145 B1 * | 10/2001 | Zhang et al. ................ 382/103 |
| 6,337,692 B1 * | 1/2002 | Rai et al. .................... 345/594 |
| 6,345,315 B1 * | 2/2002 | Mishra ....................... 719/329 |
| 6,392,668 B1 * | 5/2002 | Murray ....................... 345/738 |
| 6,421,571 B1 * | 7/2002 | Spriggs et al. ................ 700/17 |

(Continued)

OTHER PUBLICATIONS

PICS Labels; www.w3.org/hypertext/WWW/PICS/labels.html.*

(Continued)

*Primary Examiner*—Thong Vu
(74) *Attorney, Agent, or Firm*—Perkins Coie LLP (57) ABSTRACT

Generic client software, such as a web browser, is configured to include features conventionally found only in custom client software. In one embodiment of the present invention, generic client software is configured to have a parent frame which includes a data list frame and a data display frame. The data list frame display a set of identifier and a current data identifier marker. The data display frame displays a current data record. Commands to manipulate, such as a next command, are stored in the parent frame. Thus, both the data list frame and the data display frame can be updated simultaneously.

23 Claims, 7 Drawing Sheets

U.S. PATENT DOCUMENTS

| | | | |
|---|---|---|---|
| 6,452,609 B1 * | 9/2002 | Katinsky et al. | 715/716 |
| 6,466,240 B1 * | 10/2002 | Maslov | 715/853 |
| 6,580,671 B1 * | 6/2003 | Otomo et al. | 369/47.15 |
| 6,643,788 B1 * | 11/2003 | Butler et al. | 713/400 |
| 6,687,878 B1 * | 2/2004 | Eintracht et al. | 715/512 |
| 6,701,513 B1 * | 3/2004 | Bailey | 717/109 |
| 6,711,715 B1 * | 3/2004 | Grealish | 715/504 |
| 6,753,886 B1 * | 6/2004 | Schuft | 345/764 |
| 6,839,762 B1 * | 1/2005 | Yu et al. | 709/230 |
| 6,845,361 B1 * | 1/2005 | Dowling | 705/5 |
| 2002/0065848 A1 * | 5/2002 | Walker et al. | 707/511 |
| 2002/0078459 A1 * | 6/2002 | McKay | 725/78 |
| 2002/0085025 A1 * | 7/2002 | Busis et al. | 345/738 |
| 2002/0143826 A1 * | 10/2002 | Day et al. | 707/526 |
| 2003/0028823 A1 * | 2/2003 | Kallela et al. | 714/26 |
| 2004/0153649 A1 * | 8/2004 | Rhoads et al. | 713/176 |
| 2005/0162513 A1 * | 7/2005 | Chan | 348/118 |
| 2006/0150149 A1 * | 7/2006 | Chandhoke et al. | 717/109 |

OTHER PUBLICATIONS

The Programming Language wcetC—Raimund Kirner Institut ; www.wcet.at/~raimund/calc_wcet/intro_wcetc.pdf.*

An Application of the interlingua System ISS for..—Peral, Ferrández; acl.ldc.upenn.edu/W/W00/W00-0206.pdf.*

The Repository Browser; www.eas.asu.edu/~yfppg/pubs/rb.html.*

Article2; wwwiz.com/issue41/html/article2.html.*

Chapter 5 Browsing and Advanced Disk Shares; www.oreilly.com/catalog/samba/chapter/ch05.html.*

Towards Rule-Based Visual Programming of Generic Visual Systems—Hoffmann, Minas (2000) www.informatik.uni-bremen.de/~hof/research/publications/papers/Rules2000.ps.gz.*

Matching And Record Linkage—Winkler (1995) ; www.census.gov/srd/papers/pdf/rr93-8.pdf.*

Sample Designs for Watershed Assessment—Opsomer And (1999) www.public.iastate.edu/~jopsomer/papers/watershed_JABES.ps.gz.*

Frame Synchronization for a Channel with Different Data Rates, H.M. Kwon; IEEE 1990.*

Maintaining Stereo Calibration by tracking Image Points, Crowley-Bobet-Schmid, IEEE 1993.*

Lab Assignments Operating Systems 2000—Assignment 2—Bos, Kisuki, Kiel (2000) www.liacs.nl/home/osp/osp2000_2_nj.ps.*

* cited by examiner

DUAL-FRAME USER INTERFACE ON GENERIC CLIENT SOFTWARE

CROSS-REFERENCE TO COMPUTER PROGRAM LISTING APPENDIX

A computer program listing appendix, incorporated herein by reference, is submitted as part of this disclosure. The computer program listing appendix is stored under the file name: "toc.js" residing on one compact disk.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but other wise reserves all copyright rights whatsoever.

FIELD OF THE INVENTION

The present invention relates network based applications. More specifically, the present invention relates to data viewing on generic client software, such as web browsers.

BACKGROUND OF THE INVENTION

Network applications typically refers to computer applications on a first computer that interact with other computer applications running on a second computer. Network applications typically operate in a client-server paradigm or a peer-to-peer paradigm. Generally, one skilled in the art can easily adapt a network application to use either the client-server paradigm or the peer-to-peer paradigm. Thus, for clarity and conciseness, only client-server network applications are described herein.

Figure 1:
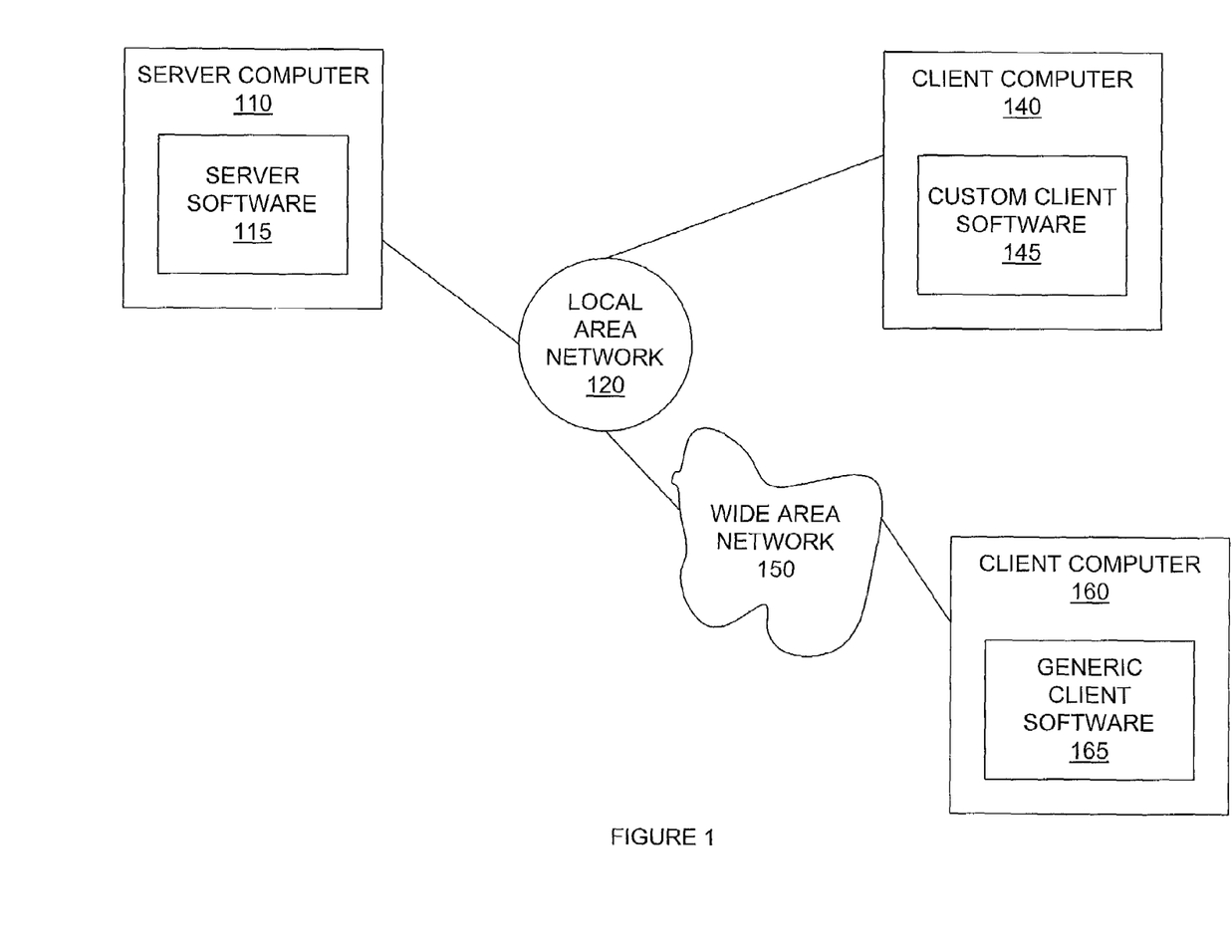
FIG. 1 is a conventional computer network.

FIG. 1 shows a typical layout for several computers. Specifically, FIG. 1 includes a server computer 110 with server software 115, a local area network 120, a client computer 140 with custom client software 145, a wide area network 150, and a client computer 160 with generic client software 165.

Server computer 110 is coupled to client computer 140 through local area network 120. Common types of local area networks include Ethernet, token ring, and FDDI. Local area network 120 is coupled to wide area network 150, which can be for example the internet. Typically, a router (not shown) is used to couple local area network 120 to wide area network 150. Client computer 160 is coupled to wide area network 150, typically through a modem (not shown) or another local area network (not shown). The data bandwidth of local area network 120 is typically between 10 and 100 megabits per seconds. However, the wide area network connection between client computer 160 and server computer 110 may be much slower such as 56 kilobits per second.

Server computer 110 typically contains data records, such as electronic mail (email) messages, data files, and electronic forum messages (e.g., newsgroup postings), which are accessible to users on client computers. Generally, server software 115 runs on server computer 110 to allow client software to access the desired data records. On local computers, i.e., computers on the same local area network such as client computer 140, custom client software, such as custom client software 145, is installed to communicate and transfer the desired data records with server software 115. For example, if the data records are email, server software 115 is a mail server such as Microsoft Exchange™ and custom client software 145 is a mail client such as Microsoft Outlook™. Because of the fast connection between local computers provided by local area network 120 and the customized features of custom client software 145, a user of client computer 140 is provided many features and benefits as described below.

Non-local client computers do not necessarily have custom client software 145. However, most computers are now configured with generic client software such as web browser (e.g., Microsoft Internet Explorer™ or Netscape Navigator™). Generic client software communicates with server software using industry standard protocols such as hypertext markup language (HTML) and JavaScript™. Server software can control generic client software to simulate some of the features of custom client software.

Figure 2:
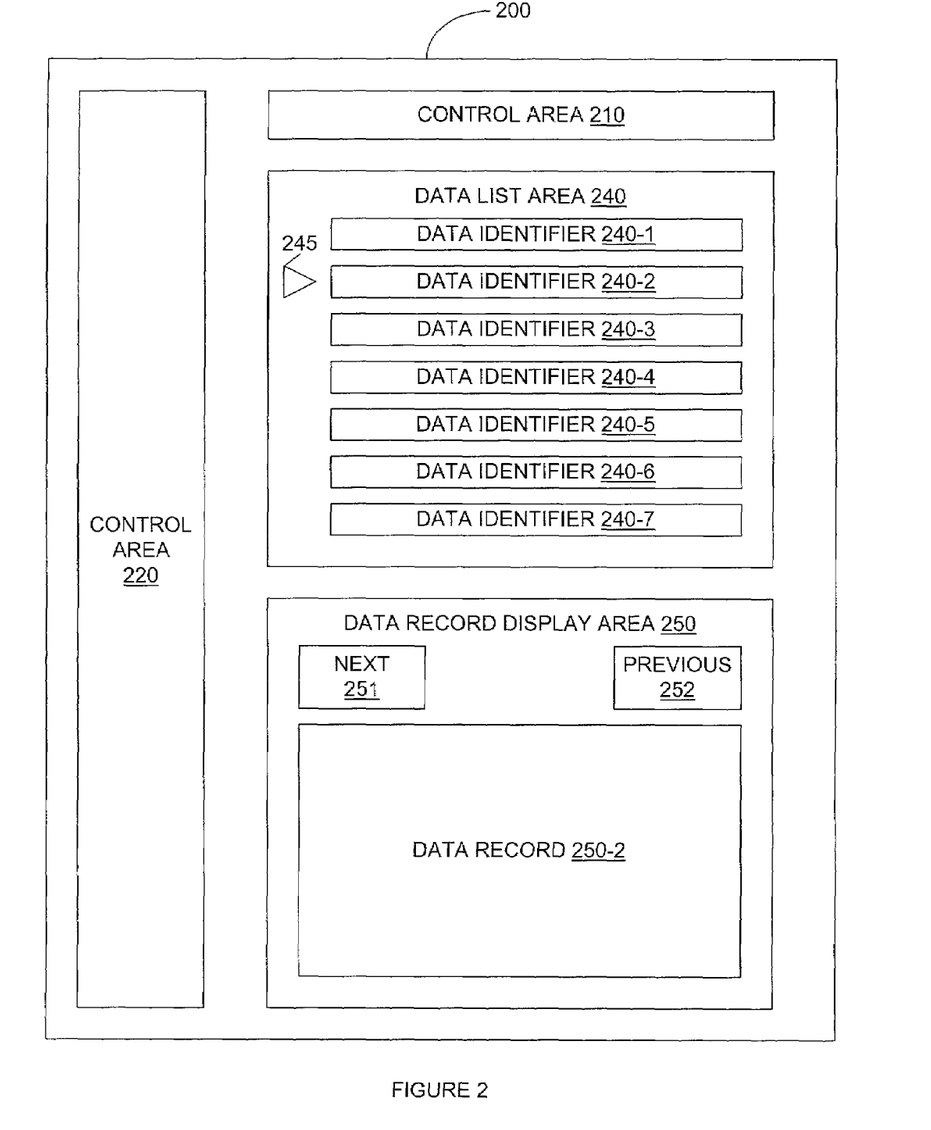
FIG. 2 is a simplified display window of a conventional custom client software.

FIG. 2 is a simplified display window 200 from custom client software 145. Display window 200 includes various control areas such as control area 210 and 220. Control areas typically include control mechanisms such as links and buttons to control the functions of custom client software 145. For example, if custom client software 145 is an email client, control areas 220 and 230 may include control mechanisms for reading email, composing new email, forwarding an email, or responding to an email. Display window 200 also includes a data list area 240 and a data record display area 250. Data list area 240 includes data identifiers 240-1, 240-2, . . . 240-7. The actual number of data identifiers may be much larger than seven. Typically, if more there are more data identifiers than can be shown on in data list area 240, data list area 240 has some mechanism, such as a scroll bar, to selectively show groups of data identifier. Data identifiers differ depending on the specific application. For example, if custom client software 145 is an email client, each data identifier indicates an email message. For email software, data identifier 240-1 may include information such as the sender, date, and subject of a corresponding email. Furthermore, data identifier 240-1 may contain additional information that is not displayed. Data list area 240 also includes a current data identifier marker 245. Current data identifier marker 245 indicates the data identifier, which corresponds to the current data record being displayed in data record display area 250. Some embodiments of data list area 240 also include status indicators (not shown) about the corresponding data record. For example, in an email application, status indicators may indicate whether the email is read, unread, or whether a reply to the email has already been sent.

Data record display area 250 displays the current data record corresponding to the current data identifier. In FIG. 2, data record display area 250 displays data record 250-2, which corresponds to data identifier 240-2, which is the current data identifier as indicated by current data identifier marker 245. In addition, data record display area 250 includes control buttons such as next button 251 and previous button 252. Next button 251 causes the data identifier following the current data identifier to become the current data identifier. In addition, the data record following the current data record becomes the current data record. Furthermore, the new current data record is displayed in data record display area 250 and current data identifier marker 245 is updated to point to the new current data identifier. For example, in FIG. 2 clicking next button 251 causes data identifier 240-3 to become the current data identifier; data record 250-3 (not shown) is displayed in data record display area 250, and current data identifier marker 245 is moved to point to data identifier 240-3.

Conversely, previous button 252 causes the data identifier preceding the current data identifier to become the current data identifier. In addition, the data record preceding the current data record becomes the current data record. Furthermore, the new current data record is displayed in data record display area 250 and current data identifier marker 245 is updated to point to the new current data identifier. For example, in FIG. 2 clicking previous button 252 causes data identifier 240-1 to become the current data identifier; data record 250-1 (not shown) is displayed in data record display area 250, and current data identifier marker 245 is moved to point to data identifier 240-1.

Many computer users require access to data records from server software 115 from different computers. For example, an employee may need to access data records from server software 115 while traveling. For example, in FIG. 1, client computer 160 may be located in a different city than server computer 110 and client computer 140. Access to server computer 110 from client computer 160 is generally limited by the bandwidth of wide area network 150. Furthermore, the specific software such as custom client software 145 may not be available on client computer 160. Therefore, server software 115 is often configured to support use of generic client software 165. In general, generic client software 165 contacts server software 115 and receives computer instructions, which configures generic client software 165 to operate with server software 115 using industry standard protocols such as HTTP and JavaScript.

However, several issues cause difficulties in replicating the features of custom client software 145 using generic client software 165. One issue is the slow speed of wide area network 150 compared to local area network 120. For example, in most implementations of custom client software 145, all the data identifiers are transmitted to custom client software 145. Thus, custom client software 145 allows a user to easily scan through portions of the data identifiers to locate a desired data record. However, the latency caused by transferring a large list of data identifiers using wide area network 150 may be unacceptable.

Another issue is due to the static nature of generic client software 165. Specifically, generic client software 165 generally requests specific data pages, such as a web page, from server software 115 using a uniform resource locator (URL). Server software 115 processes the request from generic client software 165 and sends a data page for generic client software to display. The data pages may include links (embedded URLs), which can be selected to request another data page. Thus, for example some web based email systems display a subset of the list of email message headers as links, which can be selected to display a corresponding email message in place of the email message headers. However, conventional configurations of generic client software 165 can not replicate the dual display areas typical of custom client software 145. Hence, there is a need for a method for configuring generic client software to provide the features of custom client software using industry standard protocols.

SUMMARY

Accordingly, generic client software, such as web browsers, is configured to allow different display frames to be synchronized in accordance with one embodiment of the present invention. The synchronization provided by the present invention allows common custom client software features, such as a current data identifier marker and synchronized data list viewing to be implemented. Specifically, in one embodiment of the present invention a data display system is implemented by configuring generic client software. The data display system includes a data display frame and a data list frame. The data display frame is configured to display a current data record. The data list frame is configured to display a set of data identifiers and a current data identifier marker. The current data identifier marker indicates the current data identifier which corresponds to the current data record. The data display system can also include a parent frame that contains both the data display frame and the data list frame, as well as, variables and command scripts for viewing and manipulating the data records.

For example, some embodiments of the present invention includes a next command script. The next command script is generally activated by using a next button that is displayed in either the data list frame or the data display frame. Similarly, most embodiments of the present invention would also include a previous button to activate a previous command script. The next command script is configured to request a new current data record and to update the current data identifier marker. Furthermore, in some embodiments, the command script is also configured to request additional data identifiers when the current data record corresponds to the last data identifier in the data list frame.

Some embodiments of the present invention also includes status markers for the data identifiers. For example, in one embodiment of the present invention the data display system is an email client implemented on a web browser. In the email client, the data identifiers correspond to data records that are email messages. Status markers in the data list frame can indicate whether the email message has been read, forwarded, or deleted.

The present invention will be more fully understood in view of the following description and drawings.

DETAILED DESCRIPTION

Figure 3A:
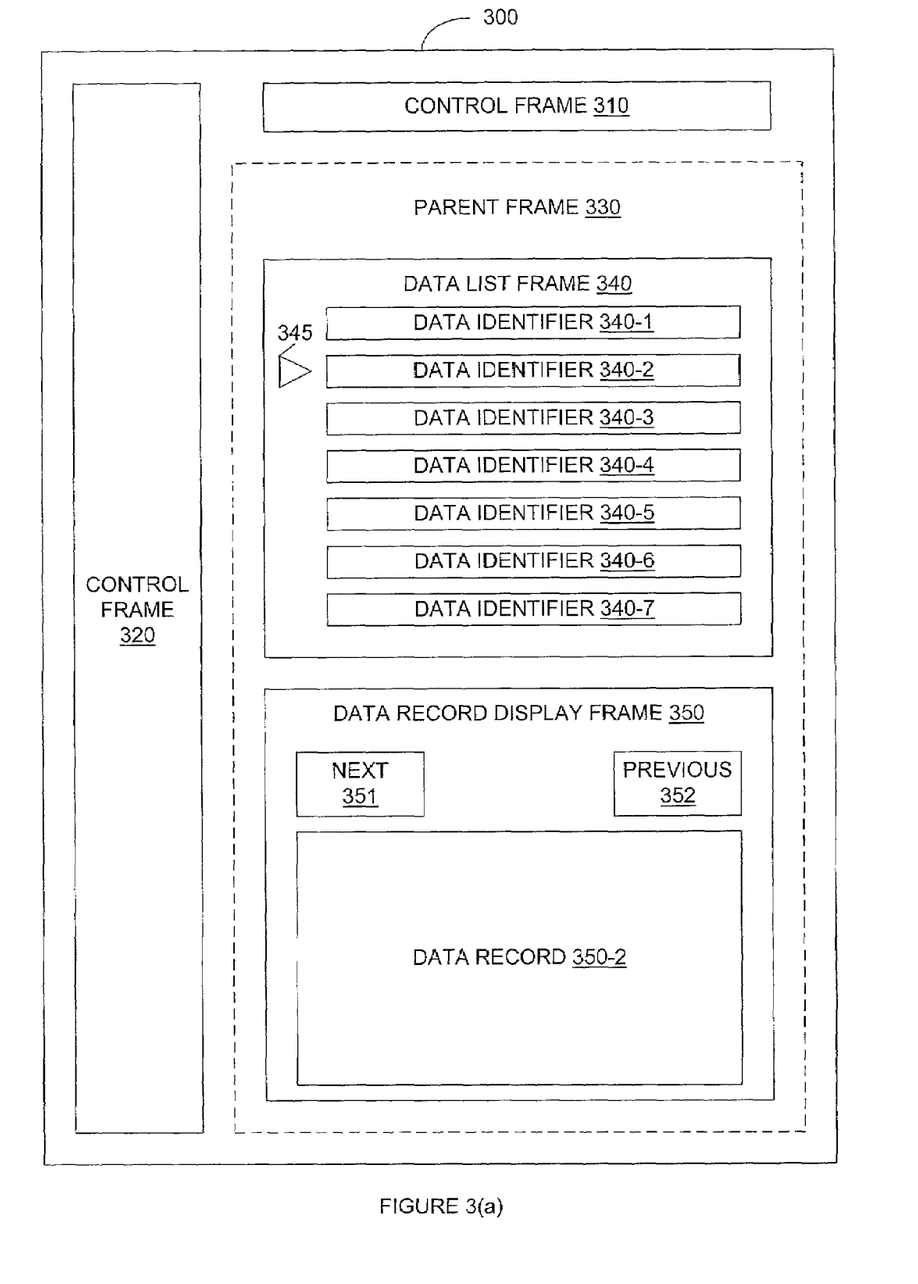
FIG. 3(a) is a simplified display window of generic client software configured in accordance with one embodiment of the present invention.
Figure 3B:
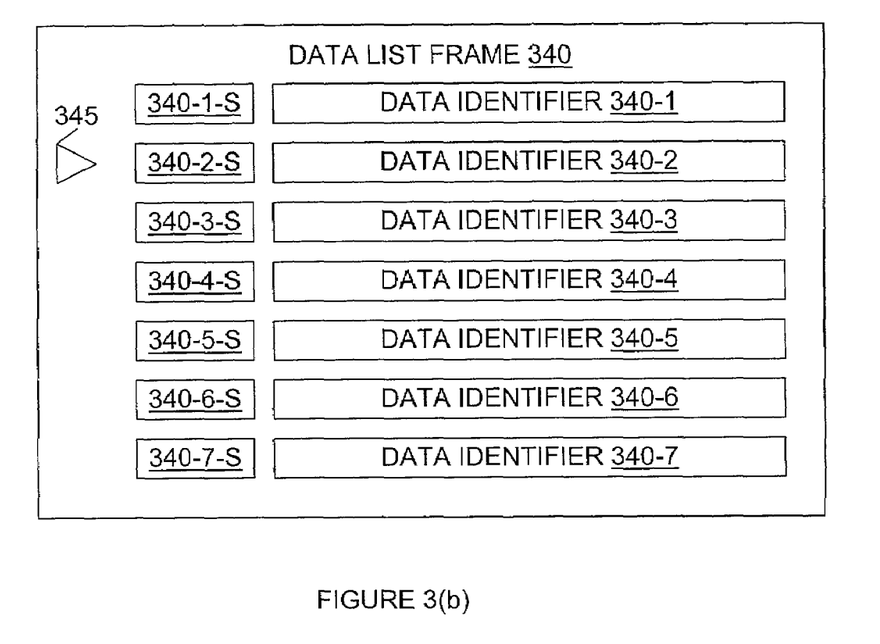
FIG. 3(b) is a data display frame in accordance with one embodiment of the present invention

FIG. 3(a) is a display window 300 from generic client software 165 configured in accordance with one embodiment of the present invention. Display window 300 is separated using frames, which segments display window 300 into distinct sections. In general, each frame can be treated as a separate data page. Display window 300 includes a control frame 310, a control frame 320, a parent frame 330, data list frame 340, and data record display frame 350. Parent frame 330, which is drawn with dashed lines, is generally not visible to a user viewing display window 300. For clarity, elements drawn with dashed lines in the figures are generally not visible to a user. Display window 300 is made to resemble display window 200 so that a user of custom client software 145 can easily adapt to using generic client software 165 to access server software 115. Thus, control frames 310 and 320 include similar control mechanisms as control areas 210 and 220. Similarly, Data list frame 340 displays data identifiers 340-1 through 340-7 as well as a current data identifier marker 345. The data identifiers in data list frame 340 are a subset of the data identifiers available from server software 115. Different embodiments of the present invention can display greater or fewer numbers of data identifiers in data list frame 340. Because of the bandwidth limitations of wide area network 150, subsets of the data identifiers are sent to generic client software 165 when needed to display. Although some embodiments of the present invention may send more data identifiers than can be currently displayed. Some embodiments of the present invention may also include a status indicator for each data identifier. For example, in FIG. 3(b) data list frame 340 also includes status indicators 340-1-S to 340-7-S, which indicates the status of data record 350-1 to 350-7, respectively. In the embodiment of FIG. 3(b) status indicators 340-1-S to 340-7-S, can use different colors to indicate different states. Alternatively, some embodiments of the present invention may use different icons to indicate different states. Still other embodiments of the present invention may use highlighting, bolding, or different colors with the data identifiers to indicate different states.

Data record display frame 350 has a next button 351, a previous button 352, and displays the current data record, which corresponds with the current data identifier. In FIG. 3(a), data display frame 350 displays data record 350-2, which corresponds to data identifier 340-2, which is the current data identifier as indicated by current data identifier marker 345. Next button 351 and previous button 352 perform the same functions as next button 251 and previous button 252, respectively. However, next button 351 and previous button 352 are implemented using industry standard protocols such as JavaScript.

Figure 4A:
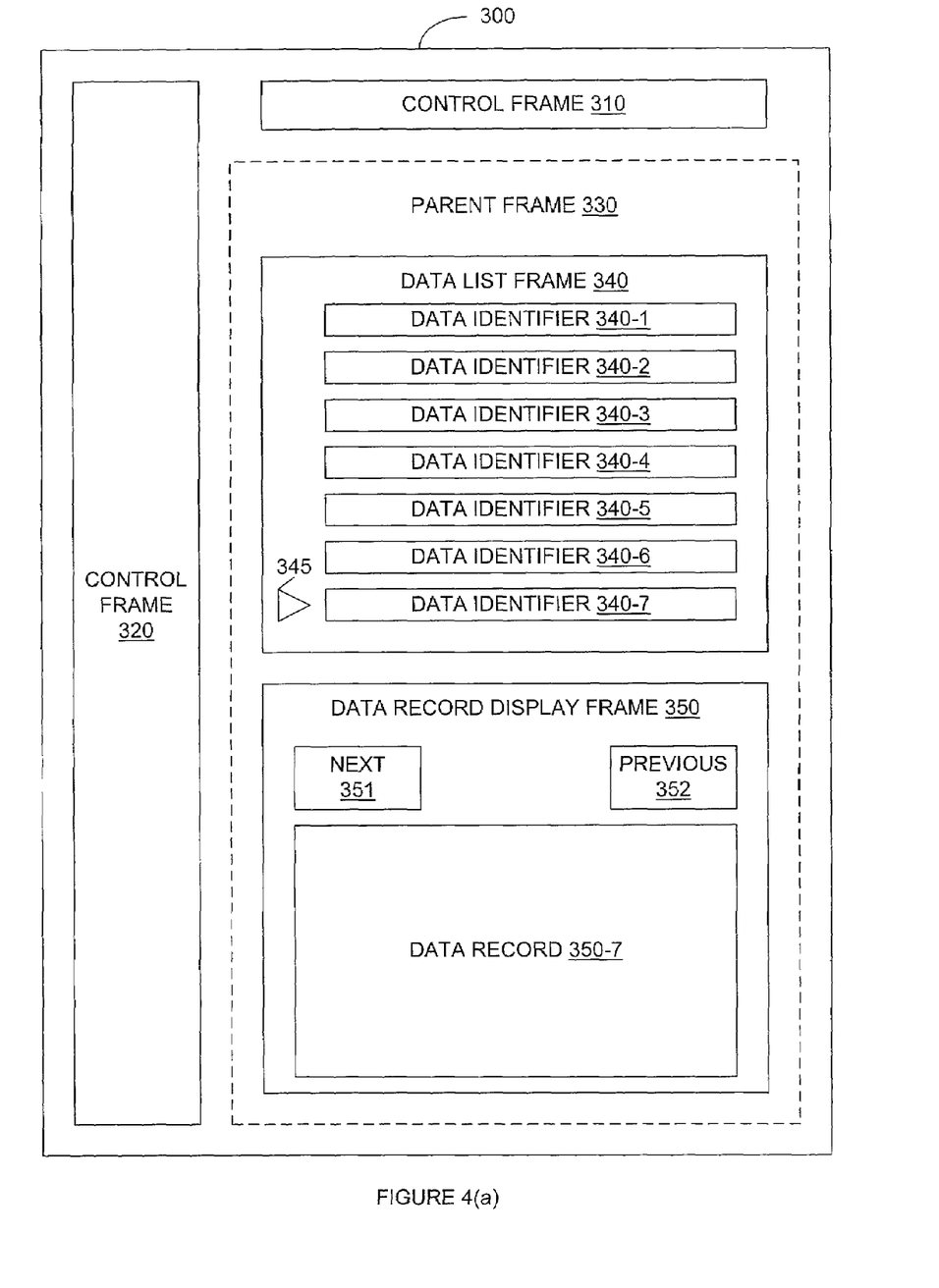
FIG. 4(a) is a simplified display window of generic client software configured in accordance with one embodiment of the present invention.
Figure 4B:
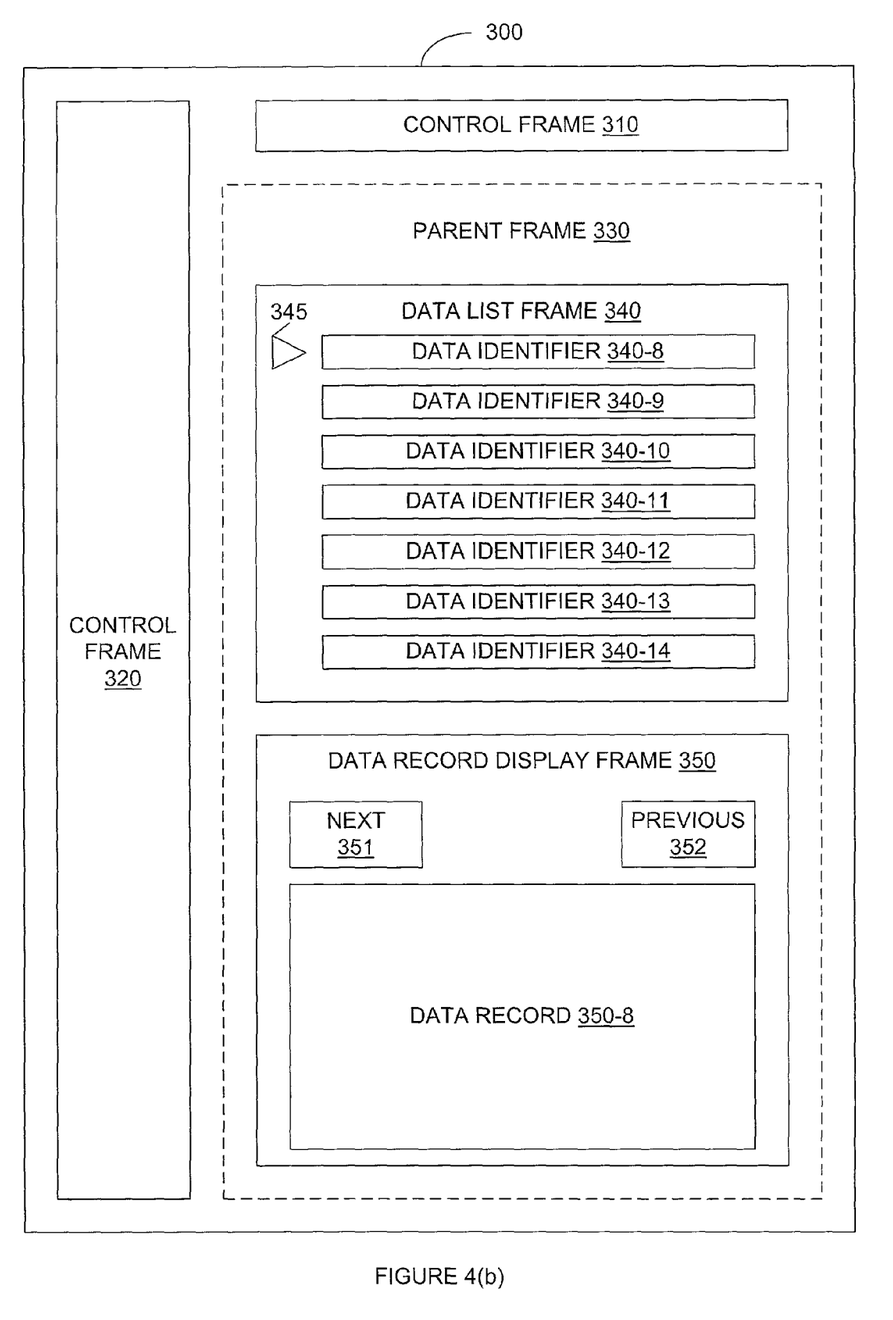
FIG. 4(b) is a simplified display window of generic client software configured in accordance with one embodiment of the present invention.

As explained above, each frame can be considered a separate data page from server software 115. When the contents of a frame changes, generic client software 165 requests a new data page from server software 115. Thus, synchronization between two different frames is difficult especially if both frames must change at the same time. For example, in FIG. 4(a) current data identifier 345 points to data identifier 340-7. Accordingly, data record display frame 350 displays data record 350-7. If a user hits next button 351, both data record display frame 350 an data list frame 340 must be updated. Specifically, as shown in FIG. 4(b), after hitting next button 351, data list frame 340 should lists data identifiers 340-8 to 340-14 and current data identifier marker 345 should point to data identifier 340-8. In addition, data record display frame 350 should display data record 350-8. However, conventional configurations of generic client software 165 are unable to provide this synchronization between frames.

A major reason synchronization has not been achieved is due to the latency, i.e. delay, of the network connection between server computer 110 and client computer 160. For example, after server software 115 dispatches a new data page to generic client software 165, server software 115 does not actually know when the dispatched page will arrive and be processed by generic client software 165. Thus, server software 115 is generally programmed to assume all new information from generic client software 165 is sent after receipt of the data page dispatched by server software 115. However, the data page sent by server software 115 may be delayed due to network congestion. Thus, generic client software 165, under control of an impatient user, may issue additional requests while using a data page that should have been replaced by the data page sent by server software 115. Thus, the information or request from generic client software 165 would likely be misinterpreted by server software 115. Consequently, server software 115 and generic client software 165 are not properly synchronized. This lack of synchronization can cause unintended and erroneous behavior in both server software 115 and generic client software 165.

Another problem causing loss of synchronization is caused by the transfer protocol used on wider area network 150 and local area network 120. Specifically, communications over computer networks generally uses packet based protocols, such as TCP/IP. In packet based protocols, data transmitted over the network are broken up into small packets. The packets, which are sent individually over the computer network, can arrive at the destination out of order but are encoded so that the packets can be reassembled properly by the networking software (not shown) on each computer. When only using local area network 120, even out of order packets will arrive quickly enough for custom client software 145 to seamlessly update multiple areas of display window 200. However, if the packets must travel over wide area network 150, the packets may arrive too slowly for generic client software 165 to update multiple frames without errors.

Figure 5:
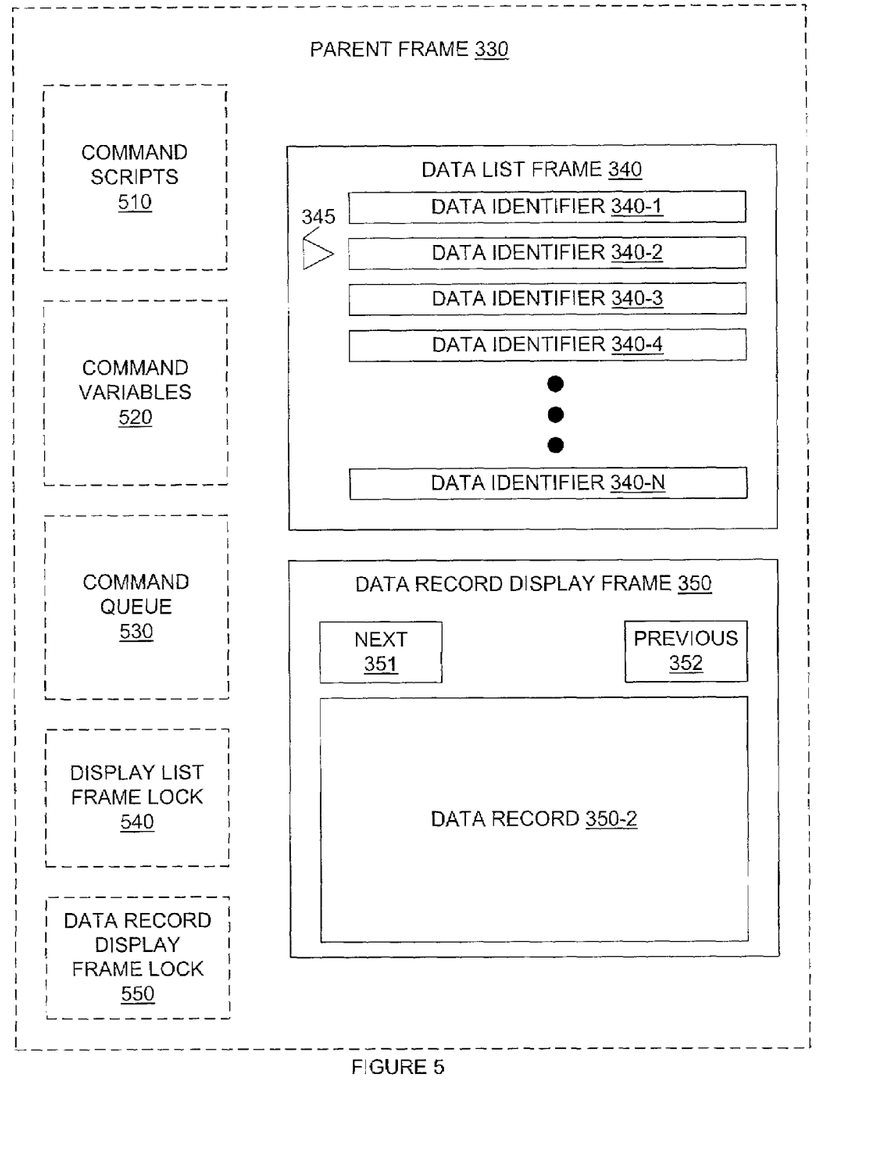
FIG. 5 is a diagram of a parent frame in accordance with one embodiment of the present invention.

The present invention solves the various issues described above by using parent frame 330. Both data list frame 340 and data record display frame 350 are children frames of parent frame 330. As shown in FIG. 5, in addition to data list frame 340 and data record display frame 350, parent frame 330 includes command scripts 510, command variables 520, a command queue 530, data list frame lock 540, and data record display frame lock 550. Command scripts 510, command variables 520, command queue 530, data list frame lock 540, and data record display frame lock 550 are generally are not visible. Command scripts 510 includes the implementation of next button 351 and previous button 352. Various other command scripts are included depending on the specific application implemented on generic client software 165. For example, if generic client software 165 is configured for email, command scripts 510 may also include a delete command script, a reply command script, and a forward command script. Corresponding buttons or links for these command scripts would also be included in data record display frame 350. The computer program listing appendix includes command scripts using JavaScript for an embodiment of the present invention which configures generic client 165 as an email client.

Command variables 520 includes any variables needed by command scripts 510. Furthermore, command variables 520 may also include persistent variables required by any command scripts in data list frame 340 or data record display frame 350. Thus, from the perspective of data record display frame 350 and data list frame 340 command variables 520 are similar to global variables in normal programming languages. Command variables 520 includes a current data identifier variable C_IDEN (not shown) which identifies the current data identifier. The specific variables included in command variables 520 depends on the application implemented by configuring generic client software 165.

Command queue 530 stores commands issued by the user of generic client software 165. For example, a user may clock on next button 351 several times. However, due to the limited bandwidth and latency of wide area network 150, parts of the data pages necessary for the command scripts associated with next button 351 may not be available. Thus, the execution of the command scripts are queued in command queue 530 until the necessary data is available.

Data list frame lock 540 and data record display frame lock 550 are indicators of whether data list frame 340 and data record display frame 350, respectively, contain valid data pages. Specifically, in one embodiment of the present invention, data list frame lock 540 enters a lock state when data list frame 340 requests a new data page from servers software 115. After the new data page is fully received, data list frame lock 540 enters an unlock state. For embodiments of the present invention using HTML, the ONLOAD command can be used to change the state of data list frame lock 540 when a data page is loaded into data list frame 340. When a command script needs to access the data page of data list frame 340 while data list frame lock 540 is in the lock state, the command script is placed in command queue 530. Similarly, data record display frame lock 550 enters a lock state when data record display frame 350 requires a new data page from servers software 115. After the new data page is fully received, data record display frame lock 540 enters an unlock state.

Upon execution, the NEXT command script checks the status of data list frame lock 540 and data record display frame lock 550 in a check lock step. If either data list frame lock 540 or data record display frame lock 550 is in the lock state, the NEXT command is stored in command queue 530 during a store in a command queue step. Execution of commands in command queue 530 are triggered using the HTTP ONLOAD command when data list frame 340 or data record display frame 350 are loaded. If both data list frame lock 540 and data record display frame lock 550 are in the unlock state, the NEXT command script requests the next data record from server software 115 in a request next data record step. In response to the request, server software 115 sends a new data page for data record display frame 350 containing the next data record. The current data identifier variable is incremented in an increment current data identifier variable step.

In a check data list frame step, a determination is made whether the new current identifier is already listed in data list frame 340. If the new current identifier is already listed in data list frame 340, current data identifier marker 345 updated to the new current data identifier and any status indicators are also updated in an update status and current marker step. If the new current data identifier is not listed in data list frame 340, the NEXT command script requests server software 115 to send a new data page for data list frame 340 which includes the new current data identifier in a request new group of data identifiers step. In some embodiments of the present invention, the check data list frame step is accomplished by first determining if the current data identifier is the last data identifier listed in data list frame 340.

The NEXT command script actually ends after the request new group of data identifiers step. However, the data page sent by server software 115 in response to the request issued by the NEXT command script includes a ONLOAD command to update the status and current data identifier marker. Thus, after the new data page is loaded into data list frame 340, the ONLOAD command is used in an ONLOAD of data list frame step. Then, in an update status and current marker step the status fields and current data identifier 345 in data list frame 340 are updated.

A previous command script associated with previous button 352 functions in a similar fashion. A set of command scripts for use with an embodiment of the present invention configured for an email application is included in the computer program listing appendix.

In the various embodiments of this invention, novel structures and methods have been described for synchronizing multiple frames of a generic client software, such as a web browser. Synchronization between frames allows common features found on custom client software on local area networks to be implemented on generic client software over wide area networks. For example, one embodiment of the present invention uses a data list frame and a data display frame. The data list frame displays a list of data identifiers and maintains a current data identifier marker on the current data identifier which corresponds to a current data record in the data display frame. The various embodiments of the structures and methods of this invention that are described above are illustrative only of the principles of this invention and are not intended to limit the scope of the invention to the particular embodiments described. For example, in view of this disclosure, those skilled in the art can define other frames, command scripts, command variables, data identifiers, data records, generic client software, server software, and so forth, and use these alternative features to create a method or system according to the principles of this invention. Thus, the invention is limited only by the following claims.

The invention claimed is:

1. A data display system implemented by configuring generic client software to resemble a portion of a display window associated with custom client software, the data display system comprising:
a data display frame configured to display a current data record;
a data list frame configured to display a first set of data identifiers and having a current data identifier marker for indicating a current data identifier corresponding to the current data record;
a data display frame lock that indicates whether the data display frame contains a valid data page; and
a data list frame lock that indicates whether the data list frame contains a valid data page,
wherein the data display frame and the data list frame facilitate accessing server software over a wide area network, and wherein the data display frame and the data list frame are synchronized over the wide area network using the data display frame lock and the data list frame lock.

2. The data display system of claim 1, further comprising a parent frame containing the data display frame and the data list frame.

3. The data display system of claim 2, wherein the parent frame further comprises a plurality of command scripts.

4. The data display system of claim 3, wherein the data display frame further comprises a next button associated with a next command script from the plurality of command scripts.

5. The data display system of claim 4, wherein the data display frame further comprises a previous button associated with a previous command script from the plurality of command scripts.

6. The data display system of claim 4, wherein the next command script is configured to request a new current data record.

7. The data display system of claim 6, wherein the next command script is also configured to update the current data identifier marker.

8. The data display system of claim 6, wherein the next command script is also configured to request a second set of data identifiers when the current data record corresponds to a last data identifier in the first set of data identifiers.

9. The data display system of claim 1, wherein the current data identifier marker is an arrow.

10. The data display system of claim 1, wherein the current data identifier marker is signified by highlighting the current data identifier.

11. The data display system of claim 1, wherein the data list frame includes a set of status markers for the set of data identifiers.

12. The data display system of claim 1, wherein the data display system is an email client.

13. The data display system of claim 1, wherein the generic client software is a web browser.

14. A method of configuring generic client software to synchronize a first frame with a second frame, the method comprising:

creating a parent frame including the first frame and the second frame, wherein the first and second frames resemble a portion of a display window created using custom client software;

storing a plurality of commands for the first frame and the second frame in the parent frame;

storing a plurality of variables for the first frame and the second frame in the parent frame;

displaying a first set of data identifiers in the first frame;

displaying a current data record in the second frame; and placing a current data record identifier next to a current data identifier corresponding to the current data record; and storing indicators of lock states for the first frame and the second frame in the parent frame, wherein storing the indicators of lock states and the plurality of commands and variables allows synchronization of the first and second frames being sent over a wide area network.

15. The method of claim 14, further comprising highlighting the current data identifier corresponding to the current data record.

16. The method of claim 14, further comprising displaying a set of status markers corresponding to the set of data identifiers in the first frame.

17. The method of claim 14, wherein the plurality of commands includes a next command.

18. The method of claim 17, further comprising requesting a new current data record when the next command is activated.

19. The method of claim 18, further comprising, updating a current data identifier marker when the next command is activated.

20. The method of claim 18, further comprising requesting a second set of data identifiers when the next command is activated and the current data record corresponds to a last data identifier in the first set of data identifiers.

21. The method of claim 14, wherein the first frame is configured to display a list of email headers.

22. The method of claim 21, wherein the second frame is configured to display an email.

23. The method of claim 14, wherein the generic client software is a web browser.

\* \* \* \* \*